United States Patent [19]

Verma et al.

[11] Patent Number: 5,658,979
[45] Date of Patent: Aug. 19, 1997

[54] FLASH POINT STABILIZED TERTIARY AMINOMETHYLATED (ALK)ACRYLAMIDE POLYMER MICROEMULSIONS AND METHOD FOR THE PRODUCTION THEREOF

[75] Inventors: Akhilkumar Gyan Verma, Stamford; Paul Sheldon Waterman, Shelton, both of Conn.

[73] Assignee: Cytec Technology Corp., Wilmington, Del.

[21] Appl. No.: 763,595

[22] Filed: Dec. 11, 1996

Related U.S. Application Data

[63] Continuation of Ser. No. 449,323, May 24, 1995, abandoned.

[51] Int. Cl.[6] ................................................ C08K 3/10
[52] U.S. Cl. .................................... 524/437; 524/443
[58] Field of Search .................................. 524/437, 443

[56] References Cited

U.S. PATENT DOCUMENTS

| | | | |
|---|---|---|---|
| 4,956,399 | 9/1990 | Kozakiewicz et al. | 524/829 |
| 4,956,400 | 9/1990 | Kozakiewicz et al. | 524/829 |

*Primary Examiner*—Jeffrey T. Smith
*Attorney, Agent, or Firm*—Frank M. Van Riet

[57] ABSTRACT

A microemulsion wherein the aqueous phase comprises a Mannich (alk)acrylamide-based polymer and contains a material effective so as to raise the Flash Point of the microemulsion to an acceptable value is disclosed in addition to a method for raising the Flash Point of such Mannich (alk)acrylamide-based polymer microemulsions.

12 Claims, No Drawings

5,658,979

FLASH POINT STABILIZED TERTIARY AMINOMETHYLATED (ALK)ACRYLAMIDE POLYMER MICROEMULSIONS AND METHOD FOR THE PRODUCTION THEREOF

This application is a continuation of Ser. No. 08/449,323 filed May 24, 1995, now abandoned.

BACKGROUND OF THE INVENTION

Microemulsions of Mannich (alk)acrylamide polymers are well known and have become increasingly important in the separation of solids from solids dispersions. These microemulsions provide faster and more complete isolation of solids from such media as municipal and industrial sludges, cellulosic suspensions such as those found in paper production e.g. paper waste, various organic and inorganic suspensions e.g. refining wastes, food wastes etc. Particulars of these microemulsions can be found in the following U.S. Pat. Nos. 4,956,399; 5,037,881 and 5,132,023.

One of the problems exhibited by these microemulsions is their tendency to possess a low Flash Point such that storage thereof over periods of time presents difficulties and hazards in handling and use especially in the presence of heat or an open flame.

Accordingly, there exists a need for Mannich (alk) acrylamide polymer-based microemulsions which have a Flash Point such that the dangers attendant low Flash Point microemulsions are obviated or reduced.

It has now been discovered that the Flash Point of Mannich (alk)acrylamide polymer based microemulsions can be satisfactorily adjusted (raised) to an acceptable value by the addition thereto of a material which accomplishes this function. The result is microemulsions which can be stored, handled and used for a reasonable period of time without fear of bursting into flame.

SUMMARY OF THE INVENTION

According to the present invention, there is provided a microemulsion comprising 1) an aqueous phase of a Mannich (alk)acrylamide-based polymer substituted with at least about 0.5 weight percent of tertiary aminomethyl groups and 2) a continuous phase comprising a hydrocarbon oil, containing 3) and effective amount of a material capable of raising the Flash Point of the microemulsion to an acceptable value.

Additionally, there is provided a method for increasing the Flash Point of a microemulsion comprising 1) an aqueous phase comprising a Mannich (alk)acrylamide-based polymer substituted with at least about 0.5 weight percent of tertiary aminomethyl groups and 2) a continuous phase comprising a hydrocarbon oil which comprises adding thereto an effective amount of a material capable of raising the Flash Point of the microemulsion to an acceptable value.

DESCRIPTION OF THE INVENTION INCLUDING PREFERRED EMBODIMENTS

According to the present invention, there is provided microemulsions comprising, as the aqueous phase, (alk) acrylamide-containing polymeric micelles, the (alk) acrylamide polymer being substituted with at least about 0.5 mole percent of tertiary aminomethyl groups and preferably having an average particle size of from 200 to about 1000 Å in diameter, said microemulsions having acceptable Flash Points. It is more preferred that the average particle size range from about 300 to about 1000 Å in diameter and even more preferred that it ranges from about 350 to 1000 Å in diameter. The polymer solids content of the microemulsions is over 10%, by weight, based on the weight of the microemulsion, and, preferably, greater than 20 percent, by weight.

The above defined microemulsions preferably comprise polyacrylamide substituted with said aminomethyl groups.

(Alk)acrylamide polymer-based microemulsions are generally prepared by polymerization of an acrylamide monomer in the aqueous phase. Polymerization is carried out by the addition of a polymerization initiator to the aqueous phase or by subjecting the monomer inverse microemulsion to ultraviolet or ionizing irradiation.

The Mannich reaction whereby the (alk)acrylamide polymer is substituted with tertiary aminomethyl groups is achieved by reaction of the polymer backbone microemulsion with a formaldehyde and secondary amine. Formaldehydes useful include formaldehyde, paraformaldehyde, trioxane or aqueous formalin, etc.

More particularly, the preparation of Mannich acrylamide polymers as small, aqueous, inverse microemulsion droplets or micelles allows the microemulsion to be prepared at a high polymer solids content while greatly reducing the interpolymer cross-linking inherent in inverse emulsion and solution product forms thereof and while simultaneously maintaining a low product bulk viscosity, as described in the above- identified U.S. Patents which are hereby incorporated herein by reference.

The backbone of the Mannich acrylamide polymer microemulsions of the present invention comprises units of such (alk)acrylamides as acrylamide, methacrylamide, ethacrylamide and the like.

The backbones of the Mannich acrylamide polymer microemulsions of the present invention may also comprise an (alk)acrylamide copolymerized with a cationic or non-ionic, water-soluble, ethylenically unsaturated comonomer in amounts up to about 90%, by weight. Water-soluble, anionic comonomers may also be used in substantially lower amounts.

Useful cationic monomers include diallyl dialkylammonium chlorides, N,N-dialkylaminoalkyl(meth)acrylates, N,N-dialkylaminoalkyl(meth)acrylamides, and salts, quaternaries and mixtures thereof.

Anionic monomers useful in the practice of this invention may comprise acrylic or methacrylic acid, fumaric acid, crotonic acid; maleic acid, salts thereof; 2-acrylamido-2-methylpropane sulfonic acid; styrene sulfonic acid and their salts and the like.

Water-soluble, non-ionic monomers, suitable in the practice of this invention, generally comprise N-vinyl pyrrolidone, N,N-dialkylmethacrylamides, hydroxyalkyl methacrylates; N-vinylformamide and the like. Small quantities, i.e. up to about 10%, by weight, of other copolymerizable monomers, such as methyl acrylate; methyl methacrylate; acrylonitrile; vinyl acetate; styrene etc. may also be used.

Formaldehydes suitable for use in this invention, as mentioned above, are selected from formaldehyde; paraformaldehyde; trioxane; aqueous formalin and mixtures thereof. Secondary amines suitable for use in the practice of this invention are selected for use in the practice of this invention are selected from those containing from about 2 to about 8 carbon atoms which are aliphatic, cyclic, straight chained or branched.

Useful secondary amines are selected from dimethylamine, methylethylamine, diethylamine, amylmethylamine, dibutylamine, dibenzylamine, piperidine, morpholine, ethanolmethylamine, ethanolethylamine, diethanolamine or mixtures thereof.

The Compositions of the present invention may be prepared using inverse microemulsion polymerization techniques as disclosed in the above-identified U.S. Patents.

In general, microemulsion polymerization processes are conducted by (i) preparing a monomer microemulsion by mixing an aqueous solution of monomers with a hydrocarbon liquid containing an appropriate surfactant or surfactant mixture to form an inverse microemulsion consisting of small aqueous monomer micelles dispersed in the continuous oil phase and (ii) subjecting the monomer microemulsion to polymerization conditions.

In order to obtain an inverse microemulsion, it is generally necessary to use particular conditions whose main parameters are as follows: surfactant concentration, HLB of surfactant or surfactant mixture, temperature, nature of the organic phase and composition of the aqueous phase.

The aqueous monomer solution may contain such conventional additives as are desired. For example, the solution may contain chelating agents to remove polymerization inhibitors, chain-transfer agents, pH adjusters, initiators and other conventional additives.

Essential to the formation of the microemulsion, which may be defined as a transparent and thermodynamically stable solution, comprising two liquids insoluble in, each other and a surfactant, in which the micelles are usually 1000 Å or less in diameter, is the selection of appropriate organic phase and surfactant.

The selection of the organic phase has a substantial effect on the minimum surfactant concentration necessary to obtain the inverse microemulsion and may consist of a hydrocarbon or hydrocarbon mixture. Isoparaffinic hydrocarbons or mixtures thereof are the most desirable in order to obtain inexpensive formulations. Typically the organic phase will comprise mineral oil, toluene, fuel oil, kerosene, odorless mineral spirits, mixtures of any of the foregoing and the like.

The ratio by weight of the amounts of aqueous phase and hydrocarbon phase is chosen as high as possible, so as to obtain, after polymerization, a microemulsion of high polymer content. Practically, this ratio may range, for example from about 0.5 to about. 3:1, and usually approximates 1:1.

The one or more surfactants are selected in order to obtain an HLB (Hydrophilic Lipophilic Balance) value ranging from about 8 to about 12. Outside this range, formation of inverse microemulsions generally cannot be attained. In addition to the appropriate HLB value, the concentration of surfactant must be optimized, i.e., sufficient to form an inverse microemulsion. Too low a concentration of surfactant leads to the formation of standard inverse emulsions and too high a concentration results in increased costs and does not impart any significant benefit. Typical surfactants useful in the practice of this invention may be anionic, cationic or nonionic. Preferred surfactants include sorbitan monooleate, polyoxyethylene (20) sorbitan monooleate, sodium dioctylsulfosuccinate, oleamidopropyldimethyl amine, sodium isostearyl-2-lactate and the like.

Polymerization of the monomers in the monomer microemulsion may be carried out in any manner known to those skilled in the art. Initiation may be effected with a variety of thermal and redox free radical initiators, including peroxides, e.g. t-butyl peroxide; azo compounds, e.g. azo-bisisobutyronitrile; inorganic compounds, such as potassium persulfate and redox couples, such as ferrous ammonium sulfate/ammonium persulfate. Initiator addition may be effected any time prior to the actual polymerization per se. Polymerization may also be effected by photochemical irradiation processes, such as ultraviolet irradiation or by ionizing irradiation from a cobalt-60 source.

It is possible to perform the Mannich substitution reaction at various stages in relation to the inverse microemulsion polymerization. The formaldehyde and secondary amine may be added after the inverse microemulsion polymerization of the (alk)acrylamide and then reacted with the resultant polymer to form the tertiary aminomethyl group on the (alk)acrylamide polymer backbone. It is also possible to react the (alk)acrylamide monomer with the formaldehyde and secondary amine prior to the inverse microemulsion formation and before polymerization of the monomers. Also contemplated, is adding the formaldehyde and secondary amine to the aqueous solution prior to polymerizing and then polymerizing the (alk)acrylamide monomer and carrying out the Mannich reaction thereafter.

As discussed above, these Mannich polymer-based microemulsions suffer from the fact that they possess Flash Points such that they often present a hazard to the ultimate user during subsequent reactions thereof e.g. quaternization of the Mannich polymer, storage of the microemulsion or use thereof for, for example, flocculation purposes. Their Flash Points are often below about 50° C. and the precautions which must be followed, as a result, detract from their desirability.

Materials have been found according to the present invention which raise the Flash Points of the Mannich polymer-based microemulsions to acceptable values i.e. to at least about 60° C. and preferably over about 90° C.

These materials are those which lower the microemulsion pH from their inherent pH range of from about 8.8 to about 9.3 to an acceptable value i.e. generally less than about 8.2, preferably in the range of from about 7.0 to about 8.2, most preferably from about 7.9 to about 8.2. A class of materials which have been found to effectively function to raise the Flash Point are the water soluble Lewis Acids. The Lewis Acids function to increase and maintain the Flash Point of the microemulsions for more than 10 days.

Examples of useful Lewis Acids which, according to the instant invention, comprise any water-soluble material containing a molecule or ion that can combine with another molecule or ion by forming a covalent bond with two elections from the second molecule or ion. Such materials include boron trifluoride, the salts of Group IB, IIB, IIIA, IVA and VIIIA elements of the Periodic Table and the like. Thus, the halides, sulfates, nitrates, carboxylates, etc. of such Group IB elements as copper, silver, gold; such Group IIB elements as zinc, cadmium, mercury; such Group IIIA elements as aluminum, gallium, indium, thallium; such Group IVA elements as tin, lead, titanium, germanium, silicon and such Group VIIIA elements as iron, cobalt and other known water-soluble Lewis Acids may be used in the present invention.

While other acids such as organic and mineral acids have been found to initially raise the Flash Point of Mannich (alk)acrylamide polymer based microemulsions, the resultant microemulsions show a tendency to rapidly lose their increased Flash Points and flash at below about 50° C. after a short period of time at room temperature.

The microemulsions containing the Lewis Acids, however, continue to show increased Flash Points for ten days or more.

The water-soluble Lewis Acids may be added to the microemulsions at any time before, during or after their preparation, however, it is preferred that they be added after the polymerization of the (alk)acrylamide monomer and after substitution of the amide groups thereof with tertiary aminomethyl groups. The Lewis Acids may be added as solutions thereof to the microemulsion, the amount of Lewis Acid which is effective for each individual microemulsion being determined by appropriate testing. Usually, amounts ranging from about 2.0 to about 40%, preferably from 4.0 to about 35%, by weight, based on real Mannich polymer, are effective to achieve the desired result i.e. raising the Flash Point to over about 60° C., preferably over about 90° C.

In a preferred embodiment, the Lewis Acids are added to the microemulsions in the form of an emulsion thereof. That is to say, the Lewis Acid is formed into an emulsion such as by the addition of an aqueous solution thereof to an oil in the presence of an emulsifier. The emulsions of the Lewis Acids may be made using the same or different emulsifiers as are used to prepare the Mannich (alk)acrylamide polymer based microemulsion. Preferably the same emulsifiers are used. It has been found that the use of an emulsion of the Lewis Acid enables the Lewis Acid to be added to the Mannich microemulsion much more rapidly and with the formation of less sediment than is experienced when the Lewis Acid is added as a solution per se.

When the Lewis Acid is added as an aqueous solution per se, it is usually necessary to carry out the addition over a period of from about 15 minutes to about 2 hours, usually 30 minutes to about 90 minutes, and, ofttimes, additional adjustments must be made by the addition of more Lewis Acid until the pH remains stable. In emulsion form, the addition of the Lewis Acid can usually be accomplished in less than about 30 minutes.

Additionally, it has been found that addition of the Lewis Acid as an aqueous solution per se for some unexplained reason appears to cause the formation of increased quantities of gel and/or beads and/or sedimentation. This formation can be significantly reduced by the use of the Lewis Acid in emulsion form.

The microemulsions of the present invention can conveniently be employed as flocculants prepared in the form of dilute aqueous solutions. These solutions can be prepared by inverting the microemulsion into water, optionally in the presence of a breaker surfactant, or by recovering the polymer from the microemulsion, such as by stripping or by addling the microemulsion to a solvent which precipitates the polymer, e.g. isopropanol or acetone, filtering off the resultant solids, drying and redispersing in water. The microemulsion can also be stripped to increase the percentage of polymer solids thereof.

The concentration of dispersions of suspended solids is carried out by adding an effective amount of the microemulsions of this invention, in aqueous solution form, to the suspension to remove water and thereby produce an effluent of desired characteristics.

The following examples are set forth for purposes of illustration only and are not to be construed as limitations on the present invention except as set forth in the appended claims. All parts and percentages am by weight unless otherwise specified.

PREPARATION OF POLYACRYLAMIDE (PAM) BACKBONE MICROEMULSION

Background Example 1

To 223 parts of an organic solution containing 182 parts of low odor paraffin oil (LPA), 29 parts of polyoxyethylene sorbitol fatty acid ester (PSFA) and 12 parts of sorbitan sesquioleate (SS) are slowly added 219 parts of an aqueous solution containing 100 parts of acrylamide, 6 parts of acetic acid, 0.2 part of isopropanol, 0.2 part of ethylenediaminetetraacetic acid tetra sodium salt, 0.15 part of sodium bromate and 112.45 parts of water. The resulting monomer emulsion is sparged for 60 minutes with nitrogen. $SO_2$ gas is then bubbled in the emulsion at a rate so as to maintain the rate of temperature increase around 2° C./min. allowing a maximum batch temperature of 650C. Once the acrylamide conversion is greater than 99%, the batch is cooled to 30° C. The result is 443 parts of a clear, stable poly(acrylamide) microemulsion having an SV between 3.0 and 4.0 cps.

PREPARATION N,N-DIMETHYLAMINOMETHANOL (DMAM-S)

Background Example 2

Paraformaldehyde (45 parts-92%, 41 parts real) is slowly added to an aqueous dimethylamine solution containing 64 parts of real dimethylamine (DMA) (DMA conc. 62.7%) (1:1 mole ratio) and 43 parts water while maintaining the temperature below 30° C. until the solids dissolve. Dicyanamide (6 pads) and 7 parts of sodium metabisulfite are added while maintaining the temperature below 35° C. and affording 203 parts of DMAM-S.

PREPARATION OF MANNICH POLYMER

Background Example 3

443 parts of the (poly) acrylamide (PAM) microemulsion of Background Example 1 are placed in a suitable reaction vessel at ambient temperature. To this are slowly adding 89 parts of LPA followed by 203 parts of the DMAM-S of Background Example 2, (mole ratio PAM/DMAM-S= 1.02:1.0), the DMAM-S being added over a 1.5 hour period while maintaining the temperature between 30–35° C. The resulting Mannich polymer microemulsion is slowly stirred at this temperature for an additional 5 hours. The resulting Mannich poly(acrylamide), 75% aminomethylated, (735 parts), is obtained as an opaque microemulsion with a pH ranging from about 8.8–9.3.

In the following Examples, the Flash Point, as used, is defined as the lowest temperature at which the vapors of the microemulsion decompose to a flammable, gaseous mixture, as determined by the standard Penske-Martin Test and the Standard Viscosity (SV) is measured by adding 8 parts of a 0.2% real aqueous polymer solution to 8.6 parts of a 2N sodium chloride solution, stirring the resulting mixture for 1 minute and determining the viscosity at room temperature using a Brookfield Viscometer with a UL adapter at 60 RPM. The Bulk Viscosity (BV) of the microemulsion is measured using a Brookfield Viscometer LVT with the indicated spindle number and speed.

A 0.2% real aqueous polymer solution is prepared by adding with good agitation, the appropriate quantity of the emulsion to the appropriate amount of deionized water at room temperature. The resulting solution is then stirred for 2 hours before use. The pH of the resulting solution is its natural pH.

The pH of the PAM-Mannich microemulsions described in this invention is obtained by stirring the microemulsion at room temperature, immersing of a ROSS combination electrode Orion Model # 8102, and allowing the pH to attain equilibrium.

EXAMPLE 1

To 400 parts of a Mannich polyacrylamide microemulsion (24.3% solids) in an appropriate reaction vessel, are added, dropwise, 13.48 parts of 50% aluminum sulfate solution over a 1.5 hour period. The physical and chemical properties of this microemulsion are monitored as a function of time and these results are set forth in Table 1, below.

EXAMPLES 2-5

Following the procedure of Example 1, a series of different Lewis Acids is used i.e. 2) 16.55 parts of $ZnCl_2$ (50% real); 3) 66.45 parts of $AlCl_3$ (50% as is); 4) parts of $CuCl_2$ (50% as is) and 5) 12.29 parts of $SnCl4$ (50% as is). The results are also set forth in Table 1, below.

Aluminum chloride is added over 30 minutes as 27 parts of an emulsion produced as discussed immediately above and held for 4 hours to allow the pH to equilibrate at 8.0. The resultant stabilized microemulsion does not flash at 205° F. after 4 weeks. After 5 weeks the microemulsion flashes at 149° F. The Standard Viscosity is maintained at 2.9 after 50 days. No sedimentation is observed.

EXAMPLE 12

The procedure of Example 1 is again followed except that the aluminum sulfate is added as an emulsion produced as

TABLE 1

Flash Point Stabilized PAM Mannich Microemulsion

| | PAM Mannich Microemulsion | | | Stabilized PAM Mannich Microemulsion | | | | |
|---|---|---|---|---|---|---|---|---|
| Example | Initial pH | SV (cps) RT | BV (cps) #3, 30 rpm | stabilized pH | SV (cps) RT | BV (cps) 3#, 30 rpm | Flash pt. Penske-Martin | SV Stability RT (cps) |
| Control | 9.01 | 3.36 | 285 | | | | Flashed at 135F after 1 day | 7 days - 3.35 |
| 1 | 9.01 | 3.36 | 285 | 8.2 | 3.39 | 810 | No flash to 213F after 24 days Flashed at 143F after 31 days | 31 days - 2.37 |
| 2 | 9.01 | 3.36 | 285 | 8.2 | 3.36 | 3250 | No flash to 212F after 2 weeks Flashed at 167F after 24 days Flashed at 135F after 31 days | 6 days - 3.13 13 days - 3.11 31 days - 2.74 |
| 3 | 9.01 | 3.36 | 285 | 8.2 | 3.43 | 1750 | No flash to 213F after 2 weeks Flashed at 149F after 24 days Flashed at 135F after 31 days | 6 days - 3.19 13 days - 3.12 21 days - 2.52 |
| 4 | 9.3 | 3 | 481 | 8.2 | | | No flash to 200F (boiling point) after 31 days | 8 days - 2.86 24 days - 2.15 |
| 5 | 9.3 | 3 | 481 | 8.2 | | | No flash to 215 F after 2 weeks Flashed at 135F after 24 days | 8 days - 2.86 24 days - 2.2 |

EXAMPLE 6 (comparative).

Following the procedure of Example 1 except that acetic acid is used in place of the aluminum sulfate, there was no flash on the same day the sample is prepared. After 1 day at room temperature, the sample flashes at 137° F. and the microemulsion pH is 8.45.

EXAMPLE 7

The procedure of Example 1 is again followed except that ferric chloride is used in place of aluminum sulfate. The resultant microemulsion flashes after 9 days.

EXAMPLES 8-10 (comparative)

Inferior results are achieved using 8) phosphoric acid, 9) lactic acid and 1 0) citric acid, when the procedure of Example 1 is used substituting these acids for the aluminum sulfate thereof, i.e., flash occurs after less than 2 days.

The generalized procedure for the preparation of a Lewis Acid emulsion is as follows. To a stirred oil phase containing PSFA (2.23 parts), SS (0.27 part) and LPA (15.68 parts) is added an aqueous aluminum chloride solution (81.8 parts 50% As-is) over a 1–2 mins period. The resulting mixture is allowed to stir for an additional 30 mins. to insure homogeneity. This oil-continuous emulsion (BV-#3, 30 RPM =300 cps) is stable for at least 2 days at room temperature.

EXAMPLE 11

The procedure of Example 3 is again followed. The pH of the PAM Mannich microemulsion is 9.3–9.4. The S.V.(cps) at RT is 3.0 and the BV(cps) is 550.

described above and the PSFA is replaced by nonylphenol ethoxylate, and added as in Example 11. The pH of the PAM Mannich microemulsion is 8.8, the SV is 3.1 and the BV is 528. After the aluminum sulfate addition, the pH is 8.0, the S.V. is 3.1 and the BV is 511. The resultant stabilized microemulsion does not flash at 205° F. after 28 days. After 37 days, the microemulsion flashes at 149° F. The S.V. is maintained at 3.1 after 20 days.

EXAMPLES 13-15

The procedures of Examples 2, and 5, respectively, are again followed except the Lewis Acid is added as an emulsion. In each instance, the emulsion is added over 30–45 minutes (as compared to 1.5-2 hours with the aqueous solutions per se). No flash occurs after 2 weeks at 212° F.

EXAMPLES 16-21

The procedures of Examples 1 and 11 are followed except that the sulfate and chloride thereof are each replaced by 16) zinc nitrate, 17) tin tartrate, 18) cobalt chloride, 19) silicon tetrachloride, 20) boron trifluoride and 21) titanium tetrabromide. In each instance, similar results are achieved.

We claim:

1. A microemulsion comprising 1) an aqueous phase of a Mannich (alk)acrylamide-based polymer substituted with at least about 0.5 weight percent of tertiary aminomethyl groups and 2) a continuous phase comprising a hydrocarbon oil, and containing an effective amount of a material capable of raising the Flash Point of the microemulsion to at least 60° C.

2. A microemulsion according to claim 1 wherein the (alk)acrylamide-based polymer is polyacrylamide.

3. A microemulsion according to claim 1 wherein the material is a water-soluble Lewis Acid.

4. A microemulsion according to claim 3 wherein the Lewis Acid is a salt of a Group IB, Group IIB, Group IIIA, Group IVA or Group VIIIA element.

5. A microemulsion according to claim 4 wherein the Lewis Acid is $AlCl_3$.

6. A microemulsion according to claim 1 wherein the material is added in the form of an emulsion.

7. A method for increasing the Flash Point of a microemulsion comprising 1) an aqueous phase comprising a Mannich (alk)acrylamide-based polymer substituted with at least about 0.5 weight percent of tertiary aminomethyl groups and 2) a continuous phase comprising a hydrocarbon oil, which comprises adding thereto an effective amount of a material capable of raising the microemulsion Flash Point to at least 60° C.

8. A method according to claim 7 wherein the (alk)acrylamide-based polymer is polyacrylamide.

9. A method according to claim 7 wherein the material is a water-soluble Lewis Acid.

10. A method according to claim 9 wherein the Lewis Acid is a salt of a Group IB, Group IIB, Group IIIA, Group IVA or Group VIIIA element.

11. A method according to claim 10 wherein the Lewis Acid is $AlCl_3$.

12. A method according to claim 9 wherein the Lewis Acid is added in the form of an emulsion.

* * * * *